United States Patent [19]

Schalk

[11] Patent Number: 5,517,558
[45] Date of Patent: May 14, 1996

[54] VOICE-CONTROLLED ACCOUNT ACCESS OVER A TELEPHONE NETWORK

[75] Inventor: Thomas B. Schalk, Dallas, Tex.

[73] Assignee: Voice Control Systems, Inc., Dallas, Tex.

[21] Appl. No.: 125,072

[22] Filed: Sep. 21, 1993

Related U.S. Application Data

[63] Continuation-in-part of Ser. No. 901,742, Jun. 22, 1992, Pat. No. 5,297,194, which is a continuation of Ser. No. 523,486, May 15, 1990, Pat. No. 5,127,043.

[51] Int. Cl.⁶ .............................. G10L 9/08; H04M 1/64; H04M 1/66
[52] U.S. Cl. ........................... 379/88; 379/189; 379/199; 381/42; 381/43
[58] Field of Search ................................ 379/88, 91, 89, 379/188, 189, 199, 95; 381/42, 43

[56] References Cited

U.S. PATENT DOCUMENTS

| | | | |
|---|---|---|---|
| 3,896,266 | 7/1975 | Waterbury | 381/42 X |
| 4,363,102 | 12/1982 | Holmgren et al. | 395/2 |
| 4,694,493 | 9/1987 | Sakoe | 381/42 |
| 4,757,525 | 7/1988 | Matthews et al. | 379/89 |
| 4,827,518 | 5/1989 | Feustel et al. | 381/42 |
| 4,850,005 | 7/1989 | Hashimoto | 379/51 |
| 4,853,953 | 8/1989 | Fujisaki | 379/88 |
| 4,910,782 | 3/1990 | Watari | 381/42 |
| 4,959,855 | 9/1990 | Daudelin | 379/213 |
| 5,127,043 | 6/1992 | Hunt et al. | 379/88 |
| 5,181,238 | 1/1993 | Medamana et al. | 379/95 |
| 5,267,299 | 11/1993 | Nomura | 379/88 |
| 5,274,695 | 12/1993 | Green | 379/88 |
| 5,297,194 | 3/1994 | Hunt et al. | 379/88 |

FOREIGN PATENT DOCUMENTS 8910612  11/1989  WIPO.

OTHER PUBLICATIONS

Naik, et al.: Speaker Verification Over Long Distance Telephone Lines, Intl. Conference of Acoustics Speech & Signal Processing (IEEE), pp. 524–527, May 1989.

Gish: Robust Discrimination in Automatic Speaker Identification, 1990 Intl. Conference of Acoustics Speech & Signal Processing (IEEE), pp.289–292, 1990.

Gong, et al: Text–Independent Speaker Recognition by Trajectory Space Comparison, 1990 Intl. Conference of Acoustics, Speech & Signal Processing (IEEE), pp. 285–288, 1990.

Liu, et al.: Study of Line Spectrum Paid Frequencies for Speaker Recognition, 1990 Intl. Conference of Acoustics, Speech & Signal Processing (IEEE), pp. 277–280, 1990.

Ren–hua, et al.: A Weighted Distance Measure Based on the Fine Structure of Feature Space: Application to Speaker Recognition, 1990 Intl. Conference of Acoustics, Speech & Signal Processing (IEEE), pp. 273–276, 1990.

Rosenberg, et al.: Sub–Word Unit Talker Verification Using Hidden Markov Models, 1990 Intl. Conference of Acoustics, Speed & Signal Processing (IEEE), pp. 269–272, 1990.

(List continued on next page.)

Primary Examiner—Thomas W. Brown
Attorney, Agent, or Firm—David H. Judson

[57] ABSTRACT

The present invention describes a system and method for enabling a caller to obtain access to services via a telephone network by entering a spoken first character string having a plurality of digits. Preferably, the method includes the steps of prompting the caller to speak the first character string beginning with a first digit and ending with a last digit thereof, recognizing each spoken digit of the first character string using a speaker-independent voice recognition algorithm, and then following entry of the last digit of the first string, initially verifying the caller's identity using a voice verification algorithm. After initial verification, the caller is again prompted to enter a second character string, which must also be recognized before access is effected.

5 Claims, 3 Drawing Sheets

OTHER PUBLICATIONS

Bennani, et al.: A Connectionist Approach for Automatic Speaker Identification, 1990 Intl. Conference of Acoustics, Speech & Signal Processing (IEEE), pp. 265–268, 1990.

Oglesby, et al.: Optimisation of Neural Models for Speaker Identification, 1990 Intl. Conference of Acoustics, Speech & Signal Processing (IEEE), pp. 261–264, 1990.

Feustal, et al.: Speaker Identity Verification Over Telephone Lines: Where We Are and Where We Are Going, 1989 ICCST, Zurich, Switzerland, pp. 181–182, 1989.

Velius: Variants of Cepstrum Based Speaker Identity Verification, 1988 Proceedings of ICASSP, pp. 1–4, 1988.

Doddington: Speaker Recognition–Identifying People by Their Voices, Proceedings of the IEEE, vol. 73, No. 11, pp. 1651–1664, Nov. 1985.

Gaganelis, et al.: A Novel Approach to Speaker Verification, 1991 Intl. Conference of Acoustics, Speech & Signal Processing (IEEE), pp. 373–376, 1991.

Bennani, et al.: On The Use of TDNN–Extracted Features Information in Talker Identification, 1991 Intl. Conference of Acoustics, Speech & Signal Processing (IEEE), pp. 385–388, 1991.

Carey, et al.: A Speaker Verification System Using Alpha–Nets, 1991 Intl. Conference of Acoustics, Speech & Signal Processing (IEEE), pp. 397–400 1991.

Rose, et al: Robust Speaker Identification in Noisy Environments Using Noice Adaptive Speaker Models 1991 Intl. Conference of Acoustics, Speech & Signal Processing (IEEE), pp. 401–404, 1991.

Xu, et al.: The Optimization of Perceptually–Based Features for Speaker Identification, Intl. Conference of Acoustics, Speech & Signal Processing, pp. 520–523 date unknown.

Perdue, et al.: CONVERSANT® Voice System: Architecture and Applications, AT&T Technical Journal, vol. 65, No. 5, pp. 34–47, Sep./Oct. 1986.

"Speaker Authentication and Voice Data Entry", Bruno–Beek et al., Conference: 21st Midwest Symposium on Circuits and Systems, Ames, Iowa, 14–15 Aug. 1978, pp. 266–273.

VOICE-CONTROLLED ACCOUNT ACCESS OVER A TELEPHONE NETWORK

This application is a continuation-in-part of prior application Ser. No. 901,742, filed Jun. 22, 1992, now U.S. Pat. No. 5,297,194, which was a continuation of prior application Ser. No. 07/523,486 filed May 15, 1990, now U.S. Pat. No. 5,127,043.

TECHNICAL FIELD

The present invention relates generally to voice recognition techniques and more specifically to a voice recognition/verification method and system for enabling a caller to obtain access to one or more services via a telephone network.

BACKGROUND OF THE INVENTION

Voice verification is the process of verifying a person's claimed identity by analyzing a sample of that person's voice. This form of security is based on the premise that each person can be uniquely identified by his or her voice. The degree of security afforded by a verification technique depends on how well the verification algorithm discriminates the voice of an authorized user from all unauthorized users.

It would be desirable to use voice verification schemes to verify the identity of a telephone caller. Such schemes, however, have not been successfully implemented. In particular, it has proven difficult to provide cost-effective and accurate voice verification over a telephone network. Generally, this is because the telephone network is a challenging environment that degrades the quality of speech through the introduction of various types of noise and band-limitations. The difficulty in providing telephone-based voice verification is further complicated by the fact that many types of microphones are used in conventional telephone calling stations. These microphones include carbon button handsets, electret handsets and electret speaker phones. Each of these devices possesses unique acoustic properties that affect the way a person's voice may sound over the telephone network.

Given the inherent limitations of the prior art as well as the poor frequency response of the telephone network, it has not been possible to successively integrate a voice recognition and verification system into a telephone network.

BRIEF SUMMARY OF THE INVENTION

It is an object of the present invention to provide a method and system for voice recognition and voice verification over a telephone network.

It is yet another object of the present invention to provide a method and system for enabling a caller to obtain access to one or more services via a telephone network using voice-controlled access techniques.

It is still another object of the invention to provide simultaneous speaker-independent voice recognition and voice verification to facilitate access to services via a band-limited communications channel.

It is another object of the invention to provide a method for verifying the claimed identity of an individual at a telephone to enable the individual to obtain access to services or privileges limited to authorized users.

These and other objects of the invention are provided in a method for enabling a caller to obtain access to services via a telephone network by entering a spoken password having a plurality of digits. The method begins by prompting the caller to speak the password beginning with a first digit and ending with a last digit thereof. Each spoken digit of the password is then recognized using a speaker-independent voice recognition algorithm. Following entry of the last digit of the password, a determination is made whether the password is valid. If so, the caller's identity is verified using a voice verification algorithm.

This method is implemented according to the invention using a system comprising a digital processor, storage means connected to the digital processor, prompt means controlled by the digital processor for prompting a caller to speak a password beginning with a first digit and ending with a last digit thereof, speech processing means controlled by the digital processor for effecting a multistage data reduction process and generating resultant voice recognition and voice verification parameter data, and voice recognition and verification decision routines. The storage means includes a read only memory for storing voice recognition feature transformation data and voice recognition class reference data both derived from a first plurality (e.g., 1000) of training speakers over a telephone network. The ROM also stores voice verification feature transformation data derived from a second plurality (e.g., 100–150) of training speakers over a telephone network. The voice recognition feature transformation and class reference data and the voice verification feature transformation data are derived in off-line training procedures. The storage means also includes a database of voice verification class reference data comprising data derived from users authorized to access the services.

The voice recognition routine comprises transformation means that receives the speech feature data generated for each digit and the voice recognition feature transformation data and in response thereto generates voice recognition parameter data for each digit. A digit decision routine receives the voice recognition parameter data and the (digit-relative) voice recognition class reference data and in response thereto generates an output indicating the digit. The voice recognition routine may also include a password validation routine responsive to entry of the last digit of the password for determining if the password is valid.

The voice verification routine is controlled by the digital processor and is responsive to a determination that the password is valid for determining whether the caller is an authorized user. This routine includes transformation means that receives the speech feature data generated for each digit and the voice verification feature transformation data and in response thereto generates voice verification parameter data for each digit. A verifier routine receives the voice verification parameter data and the (speaker-relative) voice verification class reference data and in response thereto generates an output indicating whether the caller is an authorized user.

By way of further background, assume a caller places a call from a conventional calling station telephone to a financial institution or credit card verification company in order to access account information. The caller has previously enrolled in the voice verification database that includes his or her voice verification class reference data. The financial institution includes suitable input/output devices connected to the system (or integrally therewith) to interface signals to and from the telephone line. Once the call setup has been established, the digital processor controls the prompt means to prompt the caller to begin digit-by-digit entry of the caller's preassigned password. The voice recognition algorithm processes each digit and uses a statistical recognition strategy to determine which digit (zero through nine and "oh") is spoken. After all digits have been recognized, a test is made to determine whether the entered password is valid for the system. If so, the caller is conditionally accepted. In other words, if the password is valid the system "knows" who the caller claims to be and where the account information is stored.

Thereafter, the system performs voice verification on the caller to determine if the entered password has been spoken by a voice previously enrolled in the voice verification reference database and assigned to the entered password. If the verification algorithm establishes a "match," access to the data is provided. If the algorithm substantially matches the voice to the stored version thereof, but not within a predetermined acceptance criterion, the system prompts the caller to input additional personal information (e.g., the caller's social security number or birthdate) to further test the identity of the claimed owner of the password. If the caller cannot provide such information, the system rejects the access inquiry and the call is terminated.

In the preferred embodiment of this invention, even if the verification algorithm establishes a "match" between the entered password and a voice previously enrolled in the voice verification reference database and assigned to the entered password, a further security technique is employed before the caller is provided access to his or her account or to otherwise carry out a transaction. In particular, the caller is prompted to enter some other identifying information which must then be recognized by a preferably speaker-dependent voice recognition algorithm before access is allowed. For example, if the first spoken character string is an "account number," then the additional identifying information may be the caller's social security number or other code. If the first spoken character string was a secret personal identification code, then the additional identifying information may be the caller's account number. In either case, simultaneous recognition and verification is performed on the first character string, at which point the system knows that the caller is who he or she purports to be and that the caller's voice matches (to some acceptable degree) a voice previously enrolled in the voice verification reference database and assigned to the entered character string. According to this preferred embodiment of the invention, the additional security is provided by requiring the caller to further provide the additional identifying information to prevent fraud.

Preferably, the additional identifying information is only valid for a predetermined time period (e.g., one month), and thus the subscriber will contact the service at regular intervals to alter such information. Continuous modification of the additional identifying information further enhances the security of the system.

These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts and/or steps throughout the several views of the drawings.

DETAILED DESCRIPTION

Figure 1:
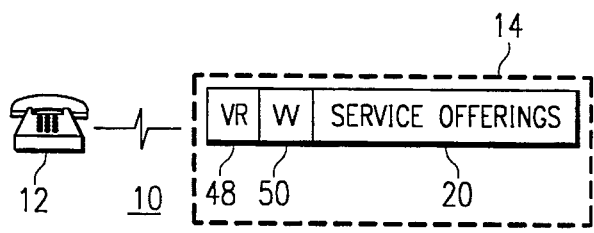
FIG. 1 is a schematic diagram of a telephone network having a calling station connectable to a digital processing system of a service provider such as a financial institution.

FIG. 1 illustrates a block diagram of a conventional telephone network 10 having a calling station 12 connectable to a digital processing system 14 of a financial institution. According to the teachings of the present invention, the digital processing system 14 includes a speaker-independent voice recognition algorithm 48 and an associated voice verification algorithm 50 to facilitate voice-controlled access to one or more services 20 offered by the financial institution. These services include, but are not limited to, account balance inquiry and electronic funds transfer. Moreover, while the following discussion describes the use of voice recognition/verification in the context of accessing information stored in a financial institution, it should be appreciated that the teachings of the invention are not so limited. The invention can be used for numerous other applications such as credit card validation and personal identification validation. Further, it should also be appreciated that the telephone network may include other devices and switching systems conventional in the art. Accordingly, calling station 12 may be connected through a central office or other switching device, such as an access tandem or interexchange carrier switching system, before connection to the service provider.

Figure 2:
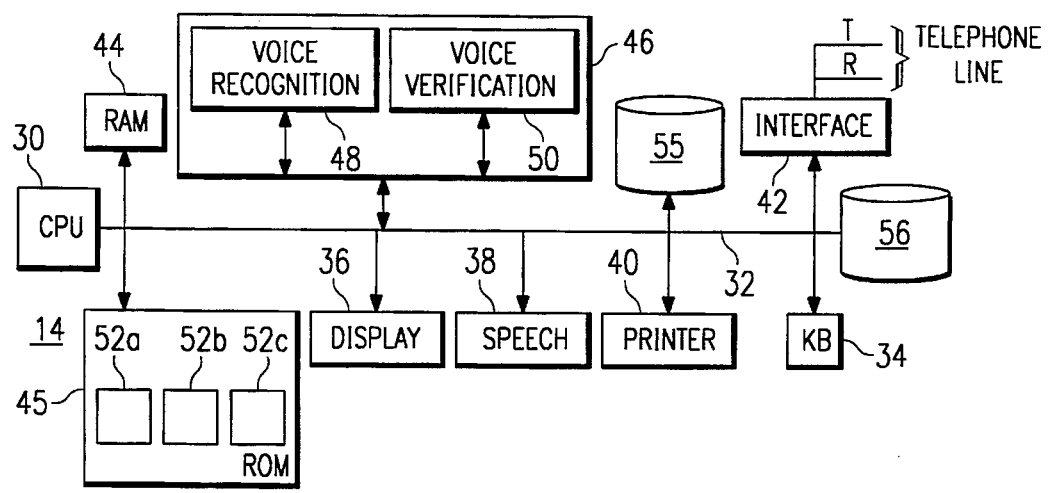
FIG. 2 is a schematic diagram of the digital processing system of FIG. 1 for use in providing speaker-independent voice recognition and verification.

Referring now to FIG. 2, a block diagram is shown of a digital processing system 14 for use in the present invention to provide the initial step of simultaneous speaker-independent voice recognition and verification. The system, described in U.S. Pat. No. 5,127,043, includes a central processing unit (CPU) 30 for controlling the overall operation of the system. The CPU includes data, address and control buses represented generally by the reference numeral 32. As seen in FIG. 2, the system 14 also includes conventional input/output devices such as a keyboard 34, display terminal 36, speech generator 38 and printer 40. A communications interface 42 (which may be microprocessor-controlled) interfaces the system to the telephone line. Random access memory ("RAM") 44 is connected to the CPU by bus 32 for providing temporary storage of data processed thereby. Read only memory ("ROM") 45 is likewise connected to the digital processor for providing permanent storage of special recognition and verification data as will be described below. Disk storage 46 supports control programs including a voice recognition algorithm 48 and a voice verification algorithm 50 as well as suitable control programs (not shown).

ROM 45 stores voice recognition reference information for use by the voice recognition algorithm 48. This information is of two (2) types: voice recognition feature transformation data 52a and voice recognition class reference data 52b derived from a first plurality of training speakers over a telephone network. In particular, voice recognition feature transformation data 52a and voice recognition class reference data 52b is derived, in a prior off-line process, from a voice recognition training database (not shown) including "digit" data from a large number of training speakers (e.g., 1000) collected over the telephone network. This training database 52 includes local and long distance data, and significant amounts of data are collected through carbon button handset microphones and electret handset microphones. The voice recognition class reference data 52b includes a representation for each digit word (e.g., "one," "two," etc.) as a "class" sought to be recognized by the voice recognition algorithm 48. For example, the representation of the class for the digit "one" is derived from the data from all of the training speakers who spoke the digit "one."

The voice recognition training database is thus designed to represent the distribution of acoustic characteristics of each digit word across a large population of speakers. The purpose and effect of the analysis performed on this database is to optimize the parameters of a multiple stage data reduction process so as to discover and accurately represent those characteristics of each digit word that differentiate it from each other digit word, regardless of speaker.

ROM 45 also supports voice verification feature transformation data 52c. This data is derived, in a prior off-line process, from a voice verification training database (not shown). In particular, the voice verification training database preferably includes data generated from approximately 100–150 training speakers and is collected over the telephone network. The database includes local and long distance data, and significant amounts of data are collected through carbon button handset microphones and electret handset microphones. Each training speaker is provided with a script containing random digit sequences. The sequences are spoken in a predetermined number (e.g., 5) of separate recording sessions, with the first recording session containing a predetermined number (e.g., 5) of passes of the digits spoken in random order. The subsequent sessions each contain a predetermined number (e.g., 3) of passes of the digits spoken in random order, and each recording session is separated from the previous session by at least one day.

The voice verification training database is thus designed to represent the distribution of acoustic characteristics of each digit word spoken by a particular training speaker across multiple utterances of the digit word by that speaker. The purpose and effect of the analysis performed on this database is to optimize the parameters of a multiple stage data reduction process so as to discover and accurately represent those characteristics of each digit word uttered by each particular training speaker that differentiate it from the same digit word uttered by each other training speaker.

The voice verification technique requires the authorized users of the system (i.e., those persons expected to call over the telephone system to access information) to have previously enrolled in the system. Accordingly, the system 14 also includes a voice verification reference database 55 comprising voice verification class reference data collected from users authorized to access the services. Enrollment is preferably accomplished by having the user speak a ten-digit password five times. For further security, the caller is asked to answer a few factual personal questions that can be answered using digits or words recognizable by the voice recognition algorithm 48. These questions may include, but need not be limited to, the user's social security number, account number or birthdate. Each "class" of the voice verification class reference data represents an authorized user of the system. The class reference data for all authorized users of the system is then stored in the voice verification reference database 55.

The system 14 also includes a transaction database 56 for storing financial and transaction data, such as account balances, credit information and the like. This information is preferably stored at predetermined locations addressed by the caller's password. Thus the password identifies both the caller and the location of the data sought to be accessed.

In operation, as described in U.S. Pat. No. 5,127,043, assume a caller places a call from the calling station 12 to the financial institution in order to access account information. The caller has previously enrolled in the voice verification reference database 55. Once the call setup has been established, the speech generator 38 of the digital processing system 14 prompts the caller to begin digit-by-digit entry of the caller's predetermined password starting with the first digit and ending with the last digit thereof. Prompting of the digits, alternatively, can be effected in any desired manner or sequence. Signals are interfaced to the telephone line by the communications interface 42. As each digit is spoken, the voice recognition algorithm 48 processes the received information and, as will be described below, uses a statistical recognition decision strategy to determine the digit (zero through nine and "oh").

After all digits have been recognized, a test is made to determine whether the entered password is valid for the system. If the outcome of the test if positive, the caller is conditionally accepted because the system "knows" who the caller claims to be and thus where the account information is stored. Thereafter, the system uses the voice verification algorithm 50 to perform voice verification on the caller to determine if the entered password has been spoken by a voice previously enrolled in the database 55 and assigned to the entered password. If the verification algorithm 50 establishes a "match" within predetermined acceptance criteria, access to the data or other system service is allowed (although in the preferred embodiment an additional security check is required as will be described). If the algorithm 50 cannot substantially match the entered voice to a voice stored in the database 55, the system rejects the access inquiry and the call is terminated. If the algorithm 50 substantially matches the entered voice to a voice stored in the database 55, but not within a predetermined acceptance criterion, the system prompts the caller to input additional personal information (e.g., the caller's social security number, account number or other key words) associated with the password to further test the identity of the claimed owner of the password. If the caller cannot provide such additional identifying information, the system rejects the access inquiry and the call is terminated. Correct entry of the requested information enables the caller to gain access to the service.

Figure 3:
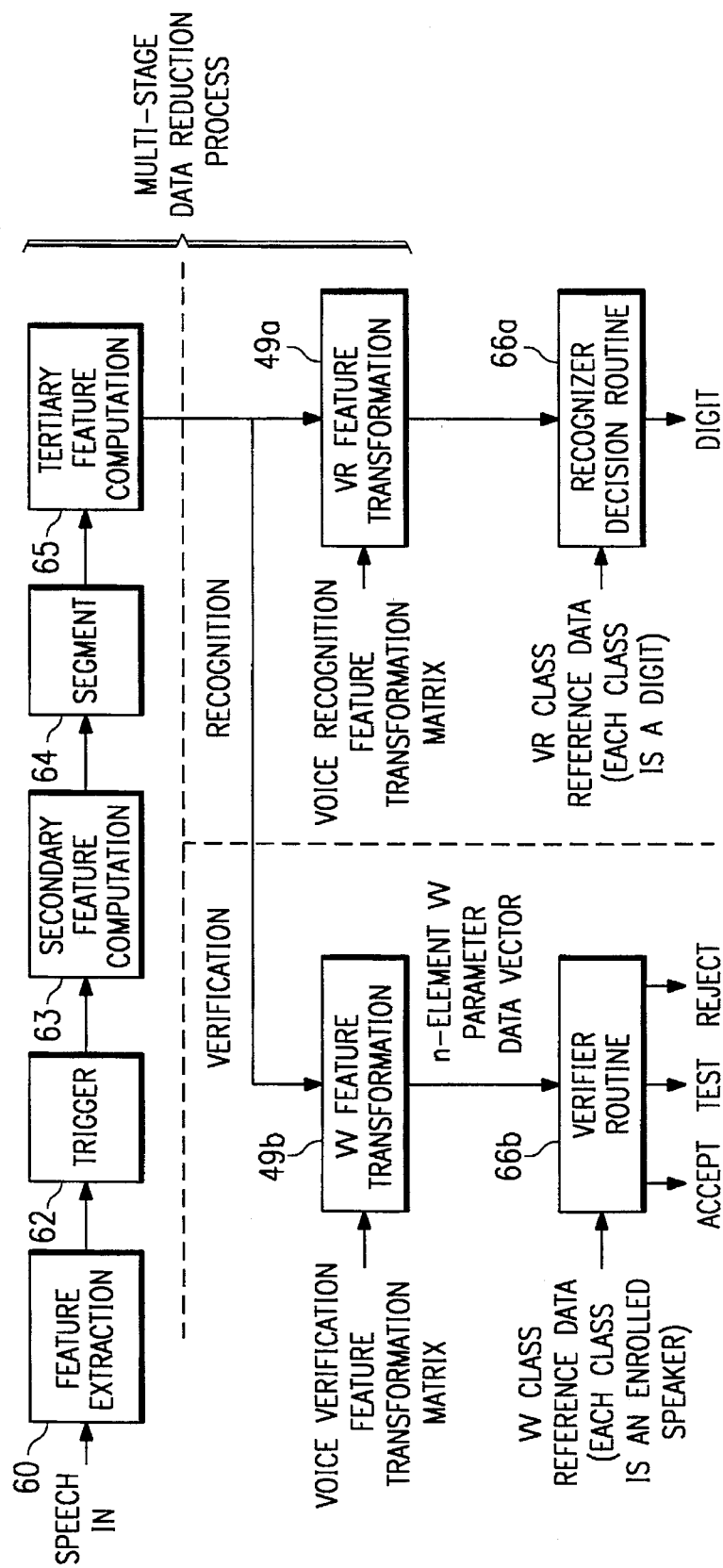
FIG. 3 is a block diagram of voice recognition/verification algorithms for use in this invention.

Referring now to FIG. 3, a block diagram is shown of an embodiment of the voice recognition and verification algorithms 48 and 50 as described in U.S. Pat. No. 5,127,043. As will be seen, algorithms 48 and 50 share the functional blocks set forth in the upper portion of the block diagram. These blocks comprise a speech processing means for carrying out a first tier of a multistage data reduction process. In particular, as speech is input to the system 14, a feature extractor 60 extracts a set of primary features that are computed in real time every 10 milliseconds. The primary features include heuristically-developed time domain features (e.g., zero crossing rates) and frequency domain information such as Fast Fourier Transform ("FFT") coefficients. The output of the feature extractor 60 is a reduced data set (approximately 4,000 data points/utterance instead of the original approximately 8,000 data points/utterance) and is applied to a trigger routine 62 that captures spoken words using the primary features. The trigger routine is connected to a secondary feature routine 63 for computing "secondary features" from the primary features. The secondary features preferably result from non-linear transformations of the primary features. The output of the routine 63 is connected to phonetic segmentation routine 64. After an utterance is captured and the secondary features are computed, the routine 64 provides automatic phonetic segmentation. To achieve segmentation, the phonetic segmentation routine 64 preferably locates voicing boundaries by determining an optimum state sequence of a two-state Markov process based on a sequence of scalar discriminant function values. The discriminant function values are generated by a two-class Fisher linear transformation of secondary feature vectors. The voicing boundaries are then used as anchor points for subsequent phonetic segmentation.

After the phonetic boundaries are located by the phonetic segmentation routine, the individual phonetic units of the utterance are analyzed and so-called "tertiary features" are computed by a tertiary feature calculation routine 65. These tertiary features preferably comprise information (e.g., means or variances) derived from the secondary features within the phonetic boundaries. The tertiary features are used by both the voice recognition algorithm 48 and the voice verification algorithm 50 as will be described. The output of the routine 65 is a tertiary feature vector of approximately 300 data points/utterance. As can be seen then, the upper portion of FIG. 3 represents the first tier of the multistage data reduction process which significantly reduces the amount of data to be analyzed but still preserves the necessary class separability, whether digit-relative or speaker-relative, necessary to achieve recognition or verification, respectively. The middle portion of FIG. 3 represents a second tier of the data reduction process and, as will be described, comprises the transformation routines 49a and 49b.

To effect speaker-independent voice recognition, the tertiary features are first supplied to the voice recognition linear transformation routine 49a. This routine multiplies the tertiary feature vector by the voice recognition feature transformation data (which is a matrix) 52a to generate a voice recognition parameter data vector for each digit. The output of the transformation routine 49a is then applied to a voice recognition statistical decision routine 66a for comparison with the voice recognition class reference data 52b. The output of the decision routine 66a is a yes/no decision identifying whether the digit is recognized and, if so, which digit is spoken.

Specifically, decision routine 66a evaluates a measure of word similarity for each of the eleven digits (zero through nine, and oh) in the vocabulary. The voice recognition class reference data 52b includes various elements (e.g., acceptance thresholds for each digit class, inverse covariances and mean vectors for each class) used by the decision strategy. For a digit to be declared (as opposed to being rejected), certain acceptance criteria must be met. The acceptance criteria may include, but need not be limited to, the following. The voice recognition algorithm determines the closest match between the class reference data and the voice recognition parameter vector for the digit; this closest match is a so-called "first choice." The next closest match is a "second choice." Each choice has its own matching score. The digit is declared if (1) the matching score of the first choice is below a predetermined threshold, and (2) the difference between the matching score(s) of the first choice and the second choice digits is greater than another predetermined threshold. When all digits of the password have been recognized, the voice recognition portion of the method is complete.

To effect voice verification, the tertiary features are also supplied to a linear transformation routine 49b that multiplies each tertiary feature vector by the voice verification feature transformation data (which is a matrix). The output of the routine 49b is an $N_p$-element vector p of voice verification parameter data for each digit of the password, with $N_p$ preferably approximately equal to 25. The voice verification parameter data vector p is then input to a verifier routine 66b which also receives the voice verification class reference data 52c for the caller. Specifically, the voice verification class reference data is provided from the voice verification reference database 55. As noted above, the address in the database 55 of the caller's voice verification class reference data is defined by the caller's password derived by the voice recognition algorithm 48.

Verifier routine 66b generates one of three different outputs: ACCEPT, REJECT and TEST. An ACCEPT output may authorize the caller to access data from the transaction database 56. The REJECT output is provided if the verifier disputes the purported identity of the caller. The TEST output initiates the prompting step wherein additional follow-up questions are asked to verify the caller's identity.

Figure 4:
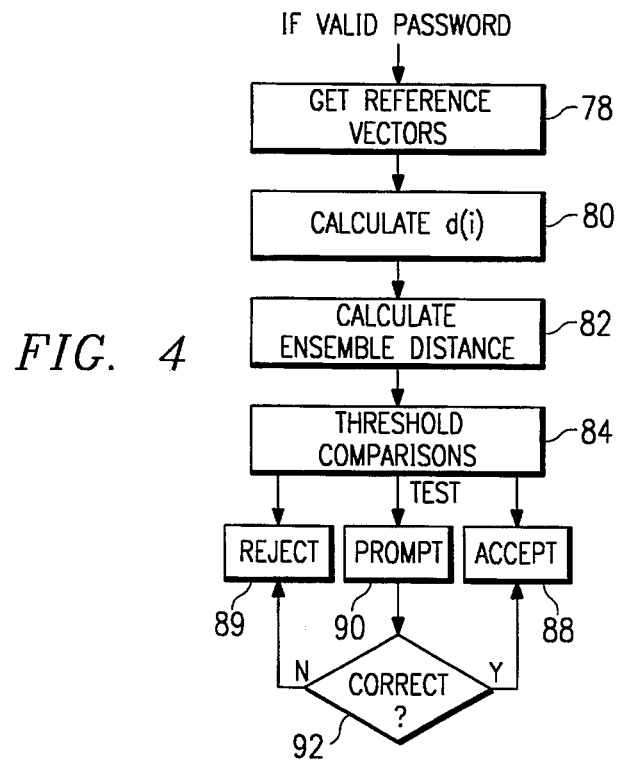
FIG. 4 is a flowchart describing the verifier routine of FIG. 3.

Referring now to FIG. 4, a flowchart is shown of verifier routine 66b of FIG. 3. By way of background, the routine begins after the determination, preferably by the voice recognition algorithm 48, that the password is valid. Although in the preferred embodiment each voice verification parameter vector is generated as each digit is recognized, it is equally possible to refrain from generating the voice verification parameter vectors until after a test is performed to determine whether the password is valid.

The verifier routine begins at step 78. In particular, the $N_p$-element voice verification parameter vectors for each digit of the spoken password are compared with the previously-generated voice verification class reference data vectors stored in the voice verification reference database 55. First, a weighted Euclidean distance d(i) is computed for each digit at step 80:

$$d(i) = \left[ \sum_{j=1}^{N_p} w_1(j) \ (p(i,j) - pr(i,j))^2 \right]^{1/2}$$

where:
p(i,j) is the jth component of the length-Np vector generated from the ith digit in the length-Nd current password entry sequence,
pr(i,j) is the jth component of the reference vector of the ith digit for the alleged enrolled caller,
$w_1$ is a constant weighting vector, precalculated to yield optimum system performance, and
d(i) is the resultant weighted Euclidean distance measure for the ith digit in the current password entry sequence.

The distance vector d is then sorted in ascending order:

$$d(i), \ldots, d(Nd) = \min_{i=1}^{Nd} (d(i)), \ldots, \max_{i=1}^{Nd} (d(i))$$

An ensemble distance is then calculated at step 82 as a weighted combination of these sorted distances:

$$D = \sum_{i=1}^{Nd} w_2(i) \, d(i)$$

where:

d is the sorted distance vector $w_2$ is another constant weighting vector, precalculated to yield optimum system performance, and D is the resultant ensemble distance measure for the entire current password entry sequence, with respect to the alleged enrolled caller.

At step 84, the ensemble distance is compared to two (2) acceptance thresholds, an upper threshold and a lower threshold. If the ensemble distance is below the lower acceptance threshold, the test is positive and the caller gains immediate access to the requested service. This is the ACCEPT output 88. If the distance is greater than the upper threshold, the caller's access to the service is denied and the method terminates. This corresponds to the REJECT output 89. If the outcome of the test 84 is between the upper and lower thresholds, the method continues at step 90 by prompting the caller to answer one or more factual questions uniquely associated with the password. This is the TEST output. For example, the caller is requested to speak his/her social security number or his/her account number. Alternatively, the caller can be prompted to enter such identifying information manually through the telephone keypad or by pulling a credit card or the like through a card reader. Of course, the nature and scope of the personal information requested by the system depends entirely on the system operator and the degree of security sought by the caller and operator. A test is then performed at step 92 to determine if the question(s) have been correctly answered. If the outcome of the test is positive, the caller again gains access to the requested service. If the outcome of the test at step 92 is negative, access is denied and the method terminates.

Accordingly, the above described system provides a voice recognition/verification system and method having several advantages over prior art telephone-based data access schemes. The problems inherent in the limited frequency response environment of a telephone network are ameliorated through the use of a speaker-independent voice recognition system and a voice verification algorithm. The voice verification algorithm is "trained" by a voice verification training database that includes speaker classifications as opposed to word classifications. Moreover, the verification algorithm uses tertiary features and voice verification feature transformation parameters to calculate a preferably 25-element vector for each spoken digit of the entered password. These vectors are then compared with voice verification class reference data (for the caller) and a weighted Euclidean distance is calculated for each digit. An ensemble distance for the entire password is then computed and compared to two acceptance thresholds to determine if the caller's voice matches his or her previously stored voice templates. Callers who "almost match" must get through an additional level of security before access to the data or service is authorized.

The digital processing system may be, but is not limited to, a IBM AT personal computer which is connected to a local area network for storing and accessing verification reference data. For telephone-based applications requiring confidential access to information, the system 14 has numerous applications. By way of example only, voice verification over the telephone network has significant potential for eliminating calling card fraud. In addition, banks and other financial institutions can provide more security to telephone-based account access systems. Presently, banking systems use personal identification numbers of "PIN" digits entered via the telephone keypad to determine elegibility for system entry. Voice verification as well as PIN digits may be employed to determine if a caller is authorized for access to account information. Other uses for the system described above include credit information access, long distance telephone network access, and electronic funds transfer. Because the voice verification operates in conjunction with voice recognition, rotary telephone users are also able to use any automated application employing the system.

Figure 5:
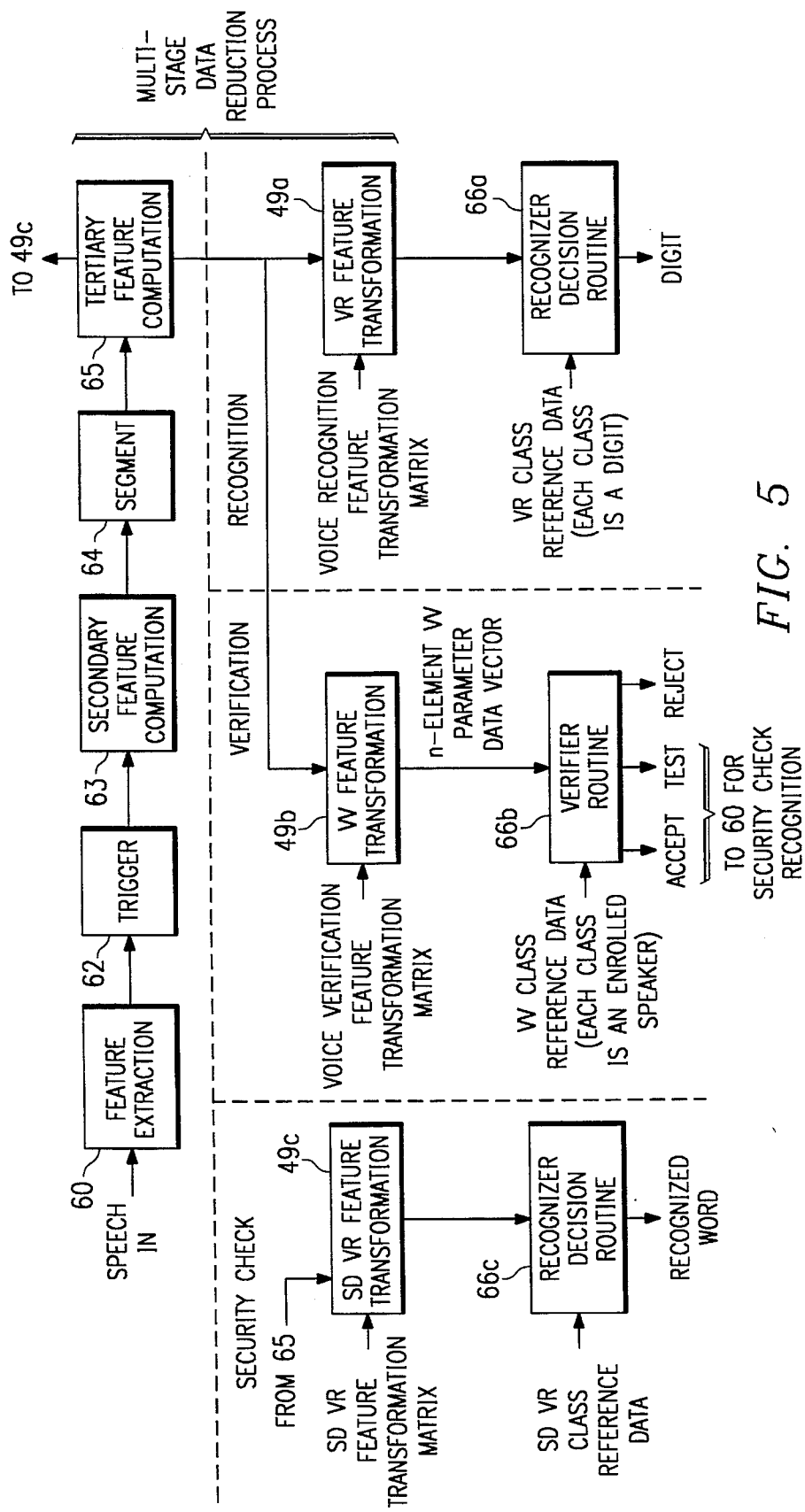
FIG. 5 is a block diagram of the preferred embodiment of the invention wherein an additional security check is performed before access is allowed to the caller's account.

In the preferred embodiment, it is desirable to provide additional security to the system. This embodiment is shown in FIG. 5, which is a modification to the system shown in FIG. 3. In this embodiment, again assume a caller places a call from a conventional calling station telephone to a financial institution or credit card verification company in order to access account information. The caller has previously enrolled in the voice verification database that includes his or her voice verification class reference data. The financial institution includes suitable input/output devices connected to the system (or integrally therewith) to interface signals to and from the telephone line. Once the call setup has been established, the digital processor controls the prompt means to prompt the caller to begin entry of a first character string. For exemplary purposes, it is assumed that the first character string is an account number. Of course, the first character string may be a secret password known only to caller. The voice recognition algorithm processes each character (in either a discrete or continuous fashion) and uses the statistical recognition strategy to determine which character is spoken as previously described with respect to FIG. 3. After all characters of the first character string have been recognized, a test may be made to determine whether the entered string is valid for the system. This step may be omitted. If the entered string is valid, the caller is conditionally accepted.

Thereafter, as previously described the system performs voice verification on the caller to determine if the entered character string has been spoken by a voice previously enrolled in the voice verification reference database and assigned to the entered password. If the verification algorithm establishes a "match," the system knows that the caller is who he or she purports to be and that the caller's voice matches (to some acceptable degree) a voice previously enrolled in the voice verification reference database and assigned to the entered character string. By "match" it is meant that the result of the verifier routine is either an ACCEPT or TEST output. In either case, however, an additional security check is performed (although it may be desirable to perform the additional security check only for the TEST output). Like the FIG. 3 embodiment, the system prompts the caller to input additional information. If the first character string was an account number, then the additional information may be caller's social security number, birthdate, or other keywords. If the first character string was itself a secret password, then the additional information might be the caller's account number. The additional security level, in either case, allows the system to further test the identity of the claimed owner of the first character string, even where the original verifier output was ACCEPT.

As seen in FIG. 5, after the caller is again prompted to enter the additional identifying information (which will be referred to hereinafter as the second character string), the string is processed again by the multi-stage data reduction process (elements 60, 62, 63, 64 and 65). At this point, the second character string is applied to a speaker-dependent voice recognition feature transformation 49c, which receives as its other input a speaker-dependent voice recognition feature transformation matrix as previously described. The output of the transformation 49c is suppled to a recognizer decision routine 66c, which receives as its other input speaker-dependent voice recognition class reference data. The output of the recognizer decision routine is a speaker-dependent word that the system must accept as the second character string before the transaction is effected. If the caller cannot provide the second character string or, if the caller provides an unrecognizable second character string associated with the first character string, then the system rejects the access inquiry and the call is terminated.

Thus according to this embodiment, even if the verification algorithm establishes a "match" between the entered password and a voice previously enrolled in the voice verification reference database and assigned to the entered password, a further security technique is employed before the caller is provided access to his or her account or to otherwise carry out a transaction. In particular, the caller is prompted to enter some other identifying information (preferably a secret password) which must then be recognized by a preferably speaker-dependent voice recognition algorithm before access is allowed. Thus simultaneous recognition and verification is performed on a first character string, at which point the system knows that the caller is who he or she purports to be and that the caller's voice matches (to some acceptable degree) a voice previously enrolled in the voice verification reference database and assigned to the entered first character string. Additional security is then provided by requiring the caller to further provide a second character string which must be recognized before the transaction is effected.

Preferably, the system requires that the authorized callers change their identifying information on a periodic basis (e.g., monthly). Thus a subscriber's additional identifying information will only be valid for a predetermined time period.

It should be appreciated by those skilled in the art that the specific embodiments disclosed above may be readily utilized as a basis for modifying or desiging other structures for carrying out the same purposes of the present invention. For example, the voice recognition algorithm 48 could alternatively be speaker-dependent instead of speaker-independent as described in the preferred embodiment. It should also be realized by those skilled in the art that such equivalent constructions do not depart from the spirit and scope of the invention as set forth in the appended claims.

What is claimed is:

1. A method for enabling a caller to obtain access to one or more services via a telephone network by speaking first and second character strings each having a plurality of characters, comprising the steps of:

(a) prompting the caller to speak the first character string beginning with a first character and ending with a last character thereof;

(b) generating speech feature data for each spoken character of the first character string;

(c) applying the speech feature data and voice recognition feature transformation data to a voice recognition feature transformation to generate a first set of parameters for each spoken character of the first character string, the first set of parameters for use in a voice recognition system;

(d) applying the speech feature data and voice verification feature transformation data to a voice verification feature transformation to generate a second set of parameters for each spoken character of the first character string, the second set of parameters for use in a voice verification system;

(e) recognizing the first character string using the first set of parameters;

(f) initially verifying the caller's identify using the second set of parameters generated for the first character string; and (g) repeating steps (a)–(c) and (e) using the second character string instead of the first character string to confirm the caller's identity.

2. The method as described in claim 1 wherein the second character string confirms the caller's identity only during a predetermined time period.

3. A method for enabling a caller to obtain access to one or more services via a telephone network by speaking first and second character strings each having one or more characters, comprising the steps of:

(a) prompting the caller to speak the first character string beginning with a first character and ending with a last character thereof;

(b) generating speech feature data for each spoken character of the first character string;

(c) applying the speech feature data of the first character string and voice recognition feature transformation data to a voice recognition feature transformation to generate a first set of parameters for each spoken character of the first character string, the first set of parameters for use in a voice recognition system;

(d) applying the speech feature data and voice verification feature transformation data to a voice verification feature transformation to generate a second set of parameters for each spoken character of the first character string, the second set of parameters for use in a voice verification system;

(e) recognizing the first character string using the first set of parameters of the first character string;

(f) initially verifying the caller's identify using the second set of parameters generated for the first character string;

(g) prompting the caller to enter the second character string beginning with a first character and ending with a last character thereof;

(h) generating speech feature data for each spoken character of the second character string;

(i) applying the speech feature data of the second character string and voice recognition feature transformation data to a voice recognition feature transformation to generate a first set of parameters for each spoken character of the second character string, the first set of parameters of the second character string for use in a voice recognition system; and (j) recognizing the second character string using the first set of parameters of the second character string.

4. The method of claim 3 further including the step of determining if the recognized second character string is a password associated with the caller verified in step (f).

5. The method as described in claim 3 further including the step of periodically changing the second character string for confirming the identity of the caller.

* * * * *